United States Patent [19]
Clarkson

[11] Patent Number: 5,398,422
[45] Date of Patent: Mar. 21, 1995

[54] MINIATURE LEVEL DEVICE

[76] Inventor: Joseph G. Clarkson, c/o Fiberglass Specialties, 4401 Eastern Ave., Baltimore, Md. 21224

[21] Appl. No.: 186,919

[22] Filed: Jan. 27, 1994

[51] Int. Cl.6 ............... G01C 9/10; A44B 15/00
[52] U.S. Cl. .................... 33/365; 70/456 R; D3/210
[58] Field of Search .............. 33/365, 370, 760; 70/456 R; D3/207, 208, 210

[56] References Cited

U.S. PATENT DOCUMENTS

| | | | |
|---|---|---|---|
| D. 279,459 | 7/1985 | On | D3/210 |
| D. 285,866 | 9/1986 | Gamble | D3/210 |
| D. 348,773 | 7/1994 | Kutzera | D3/207 |
| 466,380 | 1/1892 | Spencer | 33/365 |
| 559,090 | 4/1896 | West | 33/365 |
| 685,569 | 10/1901 | Bullard | 33/365 |
| 2,068,017 | 1/1937 | Given | 33/365 |
| 2,168,885 | 8/1939 | Richenbach et al. | 33/365 |
| 2,316,655 | 4/1943 | Voos | 70/456 R |
| 3,263,804 | 8/1966 | Marenchin | 70/456 R |
| 4,281,461 | 8/1981 | Roe | 33/760 |
| 4,514,908 | 5/1985 | Yamaguchi | 33/365 |
| 5,157,842 | 10/1992 | Swanda | 33/365 |

FOREIGN PATENT DOCUMENTS

| 1228755 | 9/1960 | France | 33/364 |
|---|---|---|---|

OTHER PUBLICATIONS

Pioneer Instrument Advertisement.

Primary Examiner—William A. Cuchlinski, Jr.
Assistant Examiner—G. Bradley Bennett
Attorney, Agent, or Firm—Harry Williams

[57] ABSTRACT

A simply-constructed miniature level device in which a small ball bearing, a visual indicator of a level condition of the device, is maintained between two races, that is, arcuate slots formed in opposing panels which are spaced-apart by opposing leg portions extending between the panels. A sleeve member disposed between the panels allows for the level to be supplied with a key-chain or key ring.

7 Claims, 1 Drawing Sheet

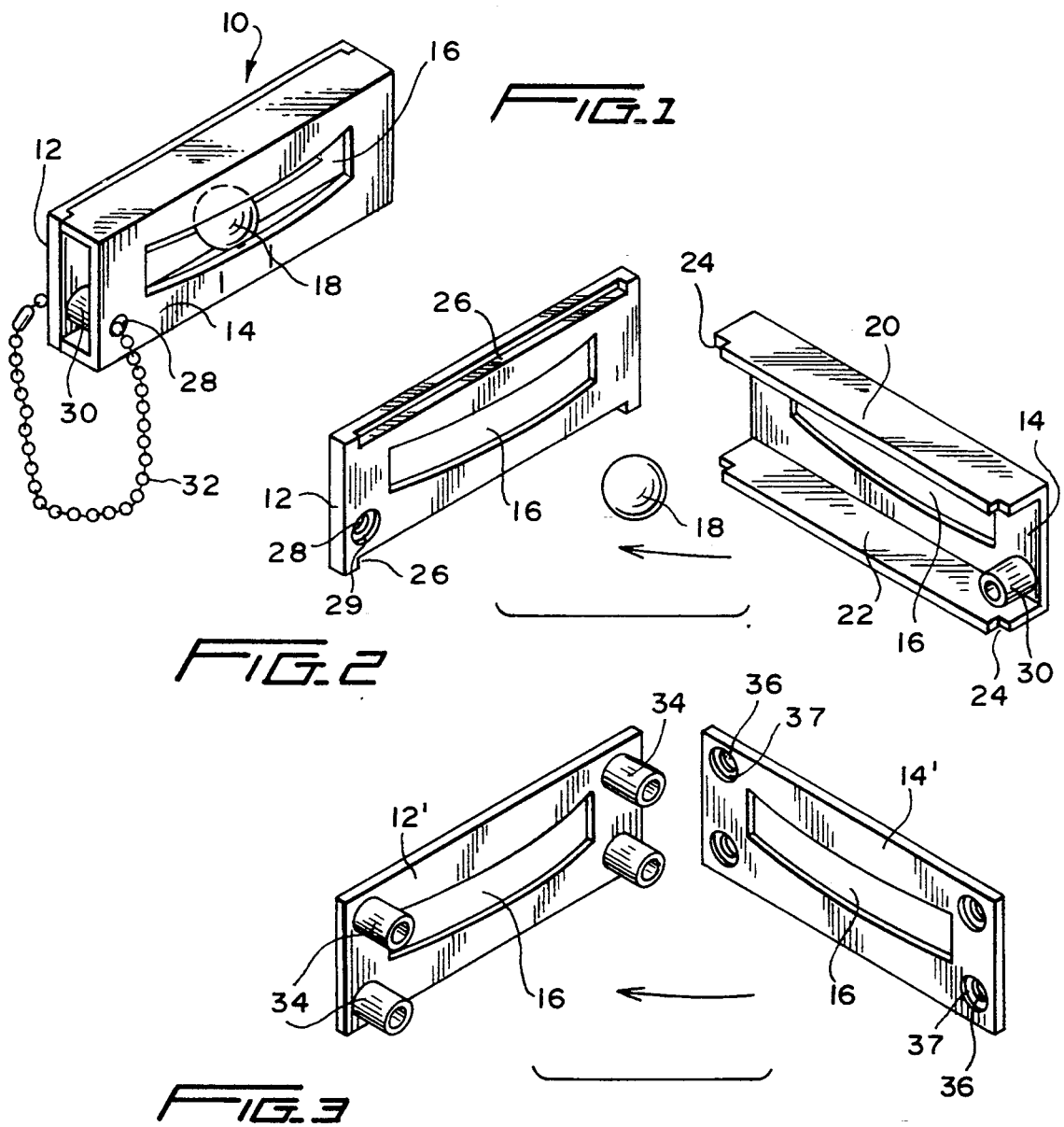

MINIATURE LEVEL DEVICE

BACKGROUND OF THE INVENTION

The present invention relates to a leveling instrument for measuring the horizontal level of surfaces.

There is a general need for a simple and easy-to-use level measuring device that can be carried in one's pocket continually and conveniently and that can be used at will and at any time when the need to know the level of a surface presents itself. In such instances a handy and miniature level measuring device might be used to measure the level of a table or an object on the table, or to measure the level of a picture being hung on a wall, or any other level measuring need, particular in the home, by anyone not necessarily having access to an array of carpentry tools, including a cumbersome carpenter's level.

OBJECTS AND SUMMARY OF THE INVENTION

It is the primary purpose and principle object of the present invention to address the aforementioned needs and provide, therefore, a miniature level device which can be carried in one's pocket on a key chain or key ring and that can be used at will, therefore, particularly in the home by the home dweller whenever the need arises without the inconvenience of having to resort to the bulk of a carpenter's level or any level that is normally is transported in a tool chest.

It is another object of the invention to provide a miniature level device which is inexpensive and simple in construction, consisting of three basic parts or elements which together form a level device that is cost-efficient to make and is easy to use.

It is yet another object of the invention to provide a miniature level device which can be carried in one's pocket and can measure the accuracy of both a horizontal and a vertical surface.

According to one embodiment of the invention there is provided a miniature level device in the form of a rectangle in which adjacent right-angle edges thereof can be used to measure the horizontal or vertical accuracy of a particular surface. A small ball bearing or marble is used as a visual indicator of a level condition of the device and is maintained between two races, that is, arcuate slots formed in opposing panels which are spaced-apart by opposing leg members extending between the panels. In one embodiment a sleeve member is disposed between the panels near a corner thereof for receiving a key-chain. In another embodiment the leg members are hollow so that a key chain or a key ring can extend through one of the leg members.

The invention will be better understood and further objects and advantages thereof will become more apparent from the ensuing detailed description of the preferred embodiment taking in conjunction with the drawings.

BRIEF DESCRIPTION OF THE DRAWINGS

FIG. 1 is a schematic perspective view of the miniature level device according to the invention;

FIG. 2 is schematic exploded view of the level device according to the invention, showing the parts disassembled just before assembly; and FIG. 3 is schematic exploded view view of the level device according to a further embodiment of the invention.

DETAILED DESCRIPTION

Referring now to FIGS. 1 and 2, there is shown a preferred form of the invention in its respective assembled and preassembled states. The miniature level device 10, not much larger than a house key, comprises two panel members 12, 14, wherein each panel member has an arcuate slot 16 formed therein and a ball bearing or marble 18 disposed therebetween so as to roll freely in the races formed by the slots in a well-known conventional manner. Indicia are provided at the nadir portion of the races to show when the ball member 18 is centered in the races at a level condition of the device. The short side of the rectangle can be used for aligning with a vertical surface and thus measure the accuracy of the vertical, whereas the long side of the rectangle is used for aligning with a horizontal surface for measuring the accuracy of the horizontal. The panel member 14 is seen to have a pair of up-standing right-angle extensions 20, 22 at the respective ends thereof. At the respective corners of each of the extension members are notches 24 that allow the longitudinal edges of the extension members 20, 22 to fit into respective recesses 26 formed along the corresponding edges of the other panel member 12 where they are secured in place by a suitable adhesive. The extension members or the parallel extension members 20, 22 of the panel member 14 insure that the two panel members 12, 14 are maintained in a spaced apart relation which will allow the marble 18 to roll freely in the races formed by the slots 16. When the level has its long side level with the horizontal the ball bearing will assume the central nadir portion of the races, as defined by alignment or indicia marks, as shown in FIG. 1.

Further provided are a pair of aligned apertures or holes 28, only one of which is shown in the panel member 12. A sleeve member 30 is provided to connect the aligned holes, as shown. As shown, a recessed area 29 surrounding the aperture 28 in the panel member 12 facilitates the alignment of the sleeve member with the aperture 28 and thus allows for a suitable adhesive to be readily applied into the recess. A similar recess (not shown) is provided in panel member 14. A key chain 32, or a key ring (not shown) may then extend through the sleeve 30 (as shown). In this way the level device according to the invention can be easily carried in one's pocket and can, of course, be used as a key chain for carrying keys in addition to the level device itself. Alternatively, the miniature level device according to the invention can be sold or marketed without a key chain and in such cases suitable instructions may be provided indicating that the device is equipped with a sleeve member, such as shown at 30, which is singularly adapted to receive a key chain or key ring. It should also be pointed out that the particular design of the races and ball-bearing combination, while known generally without regard to miniaturization, is particularly suitable for miniaturization because of the availability of small ball bearings or inexpensive marbles and the simplicity of the inexpensive race design. Of particular importance, however, is the provision of a sleeve member with aligned apertures, as above described, which enhances and underscores the miniaturization feature of the level device according to the invention and thus makes it particularly suitable for carrying in one's pocket for handy and frequent use in the home.

It is conceivable, too, that a sleeveless design could be produced, that is, using only an aligned pair of apertures in the respective panel members for receiving the key chain, although this design would not be as strong as the preferred sleeve design above-described.

Referring to FIG. 3, there is shown a further embodiment of the invention in which the spacing between the panel members 12', 14' is accomplished by the provision of hollow posts 34, any one of which may be used for receiving a key chain or a key ring. The posts 34 are seen extending as leg members from the panel member 12' and are aligned with the apertures 36 in panel member 14'. Each of the apertures 36 is seen to be provided with a surrounding recess 37 in the manner above-described with respect to the aperture 28 and recess 29, so that a suitable adhesive can be used to secure the posts or leg members 34 associated with panel member 12' to the recessed apertures 36 in the panel member 14' and vice versa. All but one of the posts may be solid for the sake of providing increased strength to the leveling device.

The foregoing relates to preferred exemplary embodiments of the present invention, it being understood that other methods and variants thereof are possible within the scope of the invention, the latter being defined by the appended claims.

What is claimed and desired to be secured by Letters Patent of the United States is:

1. A miniature level device comprising,
   a pair of generally rectangular and opposed panel members each having an arcuate slot that together form a pair of opposed and parallel races,
   one of said panel members having parallel extension members extending at right angles from respective ends of said one panel member for maintaining said panel members in a spaced apart relation,
   a roller means disposed between said races for rolling engagement therewith and for visually indicating a level condition of said level device when said roller means is in the nadir portion of said races, and
   receiving means connecting said panel members for receiving a key chain.

2. A miniature level device according to claim 1, wherein said receiving means for said key chain is a sleeve member connecting said panel members.

3. A miniature level device according to claim 2, wherein said receiving means for said key chain comprises aligned apertures in said panel members surrounded by annular recessed portions in said respective panel members for receiving the respective ends of said sleeve member.

4. A miniature level device according to claim 1, wherein said receiving means for said key chain comprises aligned apertures in said panel members.

5. A miniature level device according to claim 1, wherein said extension portions of said one panel member each have notched portions thereon for cooperating with respective recessed portions in the other of said panel members.

6. A miniature level device according to claim 1, wherein said panel members have indicia thereon in the vicinity of said nadir portion of said races.

7. A miniature level device comprising,
   a pair of generally rectangular and opposed panel members each having an arcuate slot that together form a pair of opposed and parallel races,
   a roller means disposed between said races for rolling engagement therewith and for visually indicating a level condition of said device when said roller means is in the nadir portion of said races,
   said panel members having connecting leg members outside the boundary of said races for maintaining said panel members in a spaced apart relation, and
   one of said leg members being hollow throughout its extent and forming a sleeve member therein for receiving a key chain.

* * * * *